US006748695B2

(12) United States Patent
Vento

(10) Patent No.: US 6,748,695 B2
(45) Date of Patent: Jun. 15, 2004

(54) CHEMOLUMINESCENT BAIT TANK AND BUCKET

(76) Inventor: Thomas John Vento, 1602 Mariner Dr. #21, Tampa, FL (US) 34688

( * ) Notice: Subject to any disclaimer, the term of this patent is extended or adjusted under 35 U.S.C. 154(b) by 0 days.

(21) Appl. No.: 10/000,890

(22) Filed: Nov. 2, 2001

(65) Prior Publication Data

US 2002/0046481 A1 Apr. 25, 2002

Related U.S. Application Data

(63) Continuation-in-part of application No. 09/414,788, filed on Oct. 8, 1999.

(51) Int. Cl.[7] ............................................... A01K 97/05
(52) U.S. Cl. ................... 43/57; 43/55; 43/17.5
(58) Field of Search ..................... 43/55–57, 17.5, 43/54.1, 4; 119/263; 114/255

(56) References Cited

U.S. PATENT DOCUMENTS

| 636,694 A | * | 11/1899 | Pflueger | 43/17.5 |
|---|---|---|---|---|
| 2,898,698 A | * | 8/1959 | Blair | 43/17.5 |
| 2,908,101 A | * | 10/1959 | Butler et al. | 43/17.5 |
| 3,091,882 A | * | 6/1963 | Dudley | 43/17.5 |
| 3,177,604 A | * | 4/1965 | Ewing | 43/17.5 |
| 3,427,273 A | * | 2/1969 | Newing, Jr. | 524/806 |
| 4,020,580 A | * | 5/1977 | Chappell et al. | 43/17.5 |
| 4,074,651 A | * | 2/1978 | Arduser | 43/57 |
| 4,251,943 A | * | 2/1981 | Sawlsville | 43/55 |
| 4,259,229 A | * | 3/1981 | Nikitin et al. | 524/709 |
| 4,554,189 A | * | 11/1985 | Marshall | 428/11 |
| 4,612,343 A | * | 9/1986 | Okuzono et al. | 524/547 |
| 4,677,785 A | * | 7/1987 | Lambourn | 43/57 |
| 4,748,765 A | * | 6/1988 | Martin | 43/55 |
| 4,815,411 A | * | 3/1989 | Burgess | 43/57 |
| 4,858,369 A | * | 8/1989 | Collins | 43/17.5 |
| 4,918,853 A | * | 4/1990 | Bascom et al. | 43/4 |
| 4,945,672 A | * | 8/1990 | Raia | 43/57 |
| 5,133,145 A | * | 7/1992 | McDonald | 43/17.5 |
| 5,237,448 A | * | 8/1993 | Spencer et al. | 119/792 |
| 5,259,809 A | * | 11/1993 | Rainey, Jr. | 43/100 |
| 5,267,410 A | * | 12/1993 | Peyatt | 43/57 |
| 5,376,303 A | * | 12/1994 | Royce et al. | 252/301.4 R |
| 5,406,740 A | * | 4/1995 | Wilkin | 43/56 |
| 5,560,315 A | * | 10/1996 | Lampe | 119/51.5 |
| 5,586,406 A | * | 12/1996 | Lin et al. | 43/55 |
| 5,632,220 A | * | 5/1997 | Vento | 43/57 |
| 5,651,209 A | * | 7/1997 | Rainey | 43/17.5 |
| 5,674,437 A | * | 10/1997 | Geisel | 264/21 |
| 5,853,614 A | * | 12/1998 | Hao et al. | 252/301.4 R |
| 5,865,535 A | * | 2/1999 | Edwards | 366/76.7 |
| 5,921,017 A | * | 7/1999 | Clark et al. | 43/56 |
| 6,000,168 A | * | 12/1999 | Demusz et al. | 43/65 |
| 6,305,656 B1 | * | 10/2001 | Wemyss | 248/309.4 |
| 6,474,467 B1 | * | 11/2002 | Kurdian | 206/222 |

FOREIGN PATENT DOCUMENTS

JP  8-196178 B1 * 8/1996
JP  8-205738 B1 * 8/1996

* cited by examiner

Primary Examiner—Darren W. Ark
(74) Attorney, Agent, or Firm—Pendorf & Cutliff

(57) ABSTRACT

The chemoluminescent bait container designed to illuminate live bait contained within the bait container. The bait container may be a portable bait bucket or a permanently installed live well, and is characterized in that at least a part is formed of a chemoluminescent material, such as formed by mixing a thermoplastic polymer with chemoluminescent particles.

6 Claims, 6 Drawing Sheets

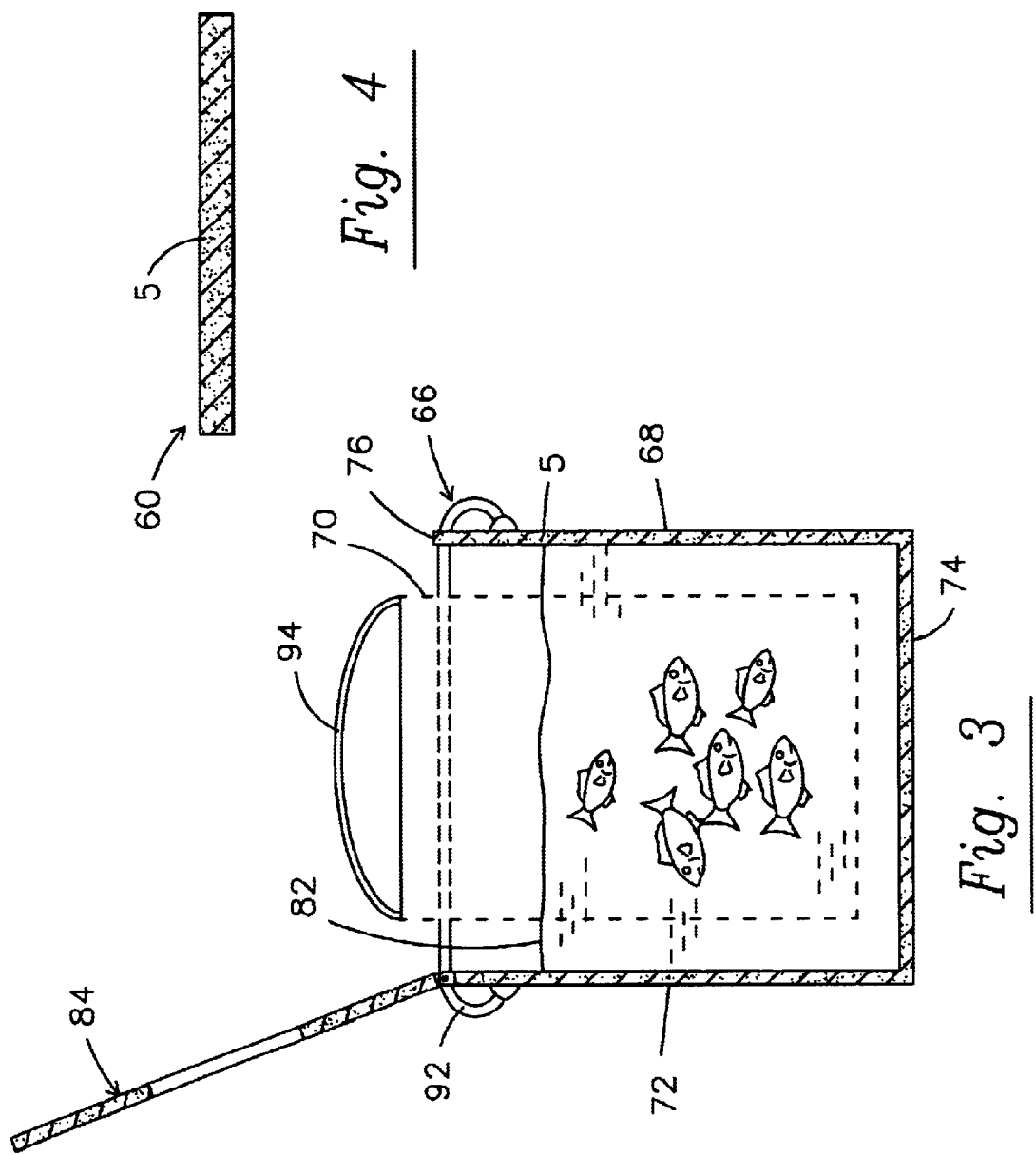

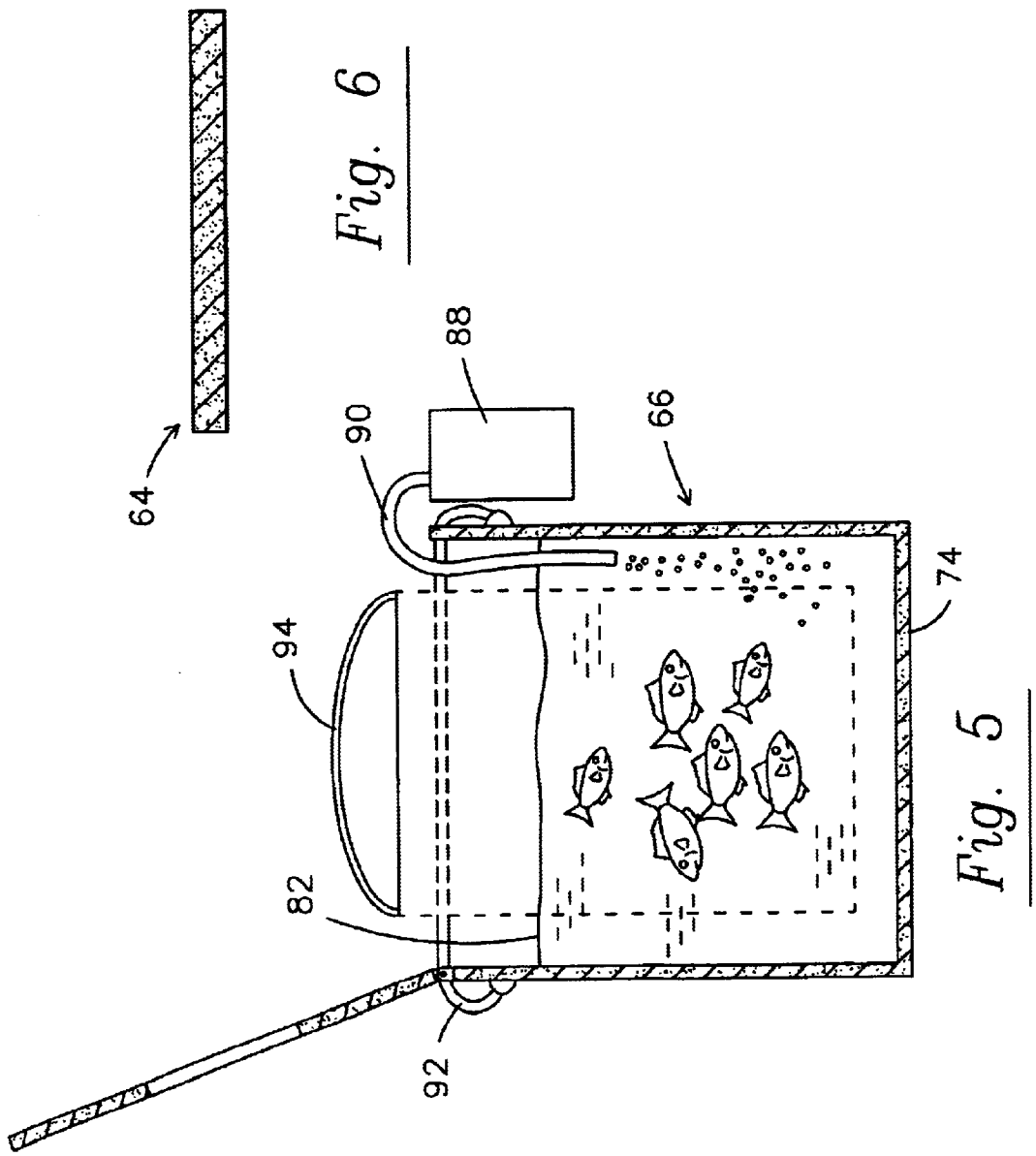

CHEMOLUMINESCENT BAIT TANK AND BUCKET

RELATED U.S. APPLICATION

This application is a continuation-in-part of Ser. No. 09/414,788, filed Oct. 8, 1999, entitled "LUMINESCENT BAIT TANK AND BUCKET," pending, the disclosure of which is incorporated herein by reference.

BACKGROUND OF THE INVENTION

1. Field of the Invention

The present invention is directed to a chemoluminescent bait container particularly suitable for night fishing, and more particularly, a bait container such as a bait bucket or live well having a chemoluminescent material incorporated into the floor, walls, or lid thereof, or having introduced therein a removable article such as a disk or cylinder or lid or even an aerator having chemoluminescent materials incorporated therein, to thereby provide a gentle illumination of the bait fish contained in the container for ease of locating, retrieving and hooking the bait fish at night, and optionally also having chemoluminescent material provided on at least one outer surface of the container, to thereby provide guidance and safety to night fishermen.

2. Description of the Related Art

When fishing from a boat or pier, it is a common practice to keep live bait fish in a container known as a "bait bucket." Fish can be kept alive for many hours in a bait bucket by using an aerator or an oxygen tablet to replenish the oxygen in the water as it is depleted by the bait fish. Alternatively, larger boats may be equipped with a live well, wherein air is introduced into the water via an aerator, or freshly oxygenated water from under the hull is pumped into the well and oxygen depleted water is discharged over the side.

It is difficult to see bait fish inside a bait container at night. The walls of the container form a light shield, so that little ambient light reaches into the bait container. This makes it difficult to select and retrieve bait fish.

Due to the use of knives and hooks by multiple fishermen in a confined area such as a pier or boat, fishing during the day is associated with a certain amount of danger. At night, the dangers are even greater, particularly in the area of high activity immediately around the bait container. There is also the problem that a portable bait container is easily kicked over, particularly in the dark.

To reduce the risks associated with night fishing, fishermen often attempt to illuminate the area of the bait container at night using flashlights, portable lamps, lanterns, or cigarette lighters. These devices often provide either too much light or not enough light. Too much light results in loss of night vision. Not enough light results in danger of the fisherman hooking or cutting himself. Hand-held devices are awkward to use while trying to perform the task of cutting or hooking bait in the fishing area, and fixed lights cast shadows, or shine into the fishermen's eyes.

Further, electrical systems are prone to failure in the marine environment due to corrosiveness of salt water, particularly on electrical wires. U.S. Pat. No. 5,406,740 teaches the illumination of the internal chamber of a bait tank with a light mounted within the bottom of the tank. The light source is electrically activated from a source of power by conductive wires that pass through a channel formed in the bottom of the tank. The light is solely for the purpose of lighting the internal compartment of the bait tank so that the fish may observe one another and the tank walls. The value of the light to the fisherman is thus limited. Further, in the case of an electrical short or a loss of power, the light source is also lost.

There is thus a need for a device which is convenient to use, will illuminate the bait container area, will be highly visible at night so it will be easy to find, and will prevent accidental tip-over of the bait container, will make retrieval and hooking of bait fish easier, and will not cause loss of night vision, thus making the night-time fishing experience more enjoyable.

Further, there is the need for a light, which is not dependent upon an electrical power source or electrical wiring.

In view of the foregoing, it is an object of the present invention to provide a live bait container, which overcomes the above disadvantages.

SUMMARY OF THE INVENTION

The present inventor has many years of experience with bait fish, and was aware of the problems associated with night fishing, but until he conceived of the present invention, was not aware that it would be possible to solve all these problems. It is surprising that all these problems can be solved in a simple and eloquent way.

The inventor discovered that all the above problems can be solved by a bait container such as a bait bucket or live well having a chemoluminescent material incorporated into or coated onto the floor, walls, or lid thereof, or having introduced therein a removable article such as a disk, square, fish-shape or cylinder or lid or even an aerator or hose having chemoluminescent materials incorporated therein or coated thereon, to thereby provide a gentle illumination of the bait fish contained in the container for ease of locating, retrieving and hooking the bait fish at night, and optionally also having chemoluminescent material provided on at least one outer surface of the container, to thereby provide guidance and safety to night fishermen.

One aspect of the present invention resides in the use of a plastic having good water resistance and mixed with chemoluminescent material to create at least a part of an aerator, a bait bucket, the bait well, or the glow plate. With the chemoluminescent plastic, a soft glowing light is provided that, in comparison to flashlights or fixed overhead lamps, is easy to use and preserves night vision while operating a vessel or fishing from a pier.

The gently and even light emitted from the chemoluminescent material makes bait selection easy.

Finally, the chemoluminescent bait container provides a safety feature to the fisherman by illuminating the bait container, and optionally the area around the bait container. The luminous bait container keeps the fisherman from tripping over the container and provides enough light to bait the fishhook.

The foregoing has outlined rather broadly the more pertinent and important features of the present invention in order that the detailed description of the invention that follows may be better understood and so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other illuminated bait tanks for carrying out the same purposes of the present invention.

BRIEF DESCRIPTION OF THE DRAWINGS

For a fuller understanding of the nature and objects of the present invention, reference should be made by the following detailed description taken in with the accompanying drawings in which:

FIG. 3 shown is a cross-sectional view of a chemoluminescent bait bucket and lid of the present invention.

FIG. 4 shown is a cross-sectional view of a chemoluminescent glow disc.

FIG. 5 shown is a cross-sectional view of a chemoluminescent bait bucket with a pump.

FIG. 6 shown is a cross-section view of the chemoluminescent lid for the bait tank.

DETAILED DESCRIPTION OF THE INVENTION

Figure 1:
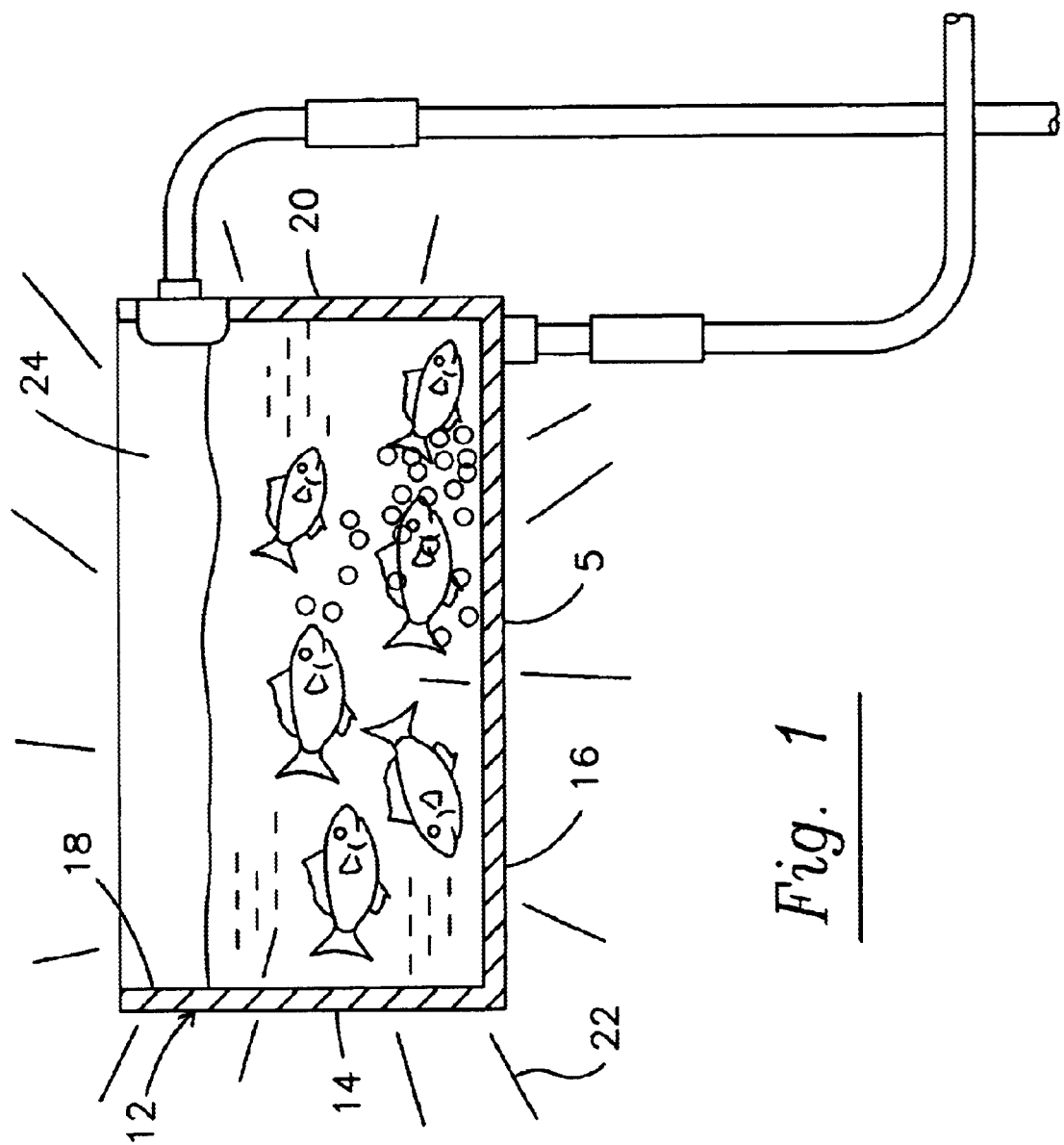
FIG. 1 shown is a cross-sectional view of a chemoluminescent bait tank of the present invention.

The present invention is directed to a chemoluminescent bait container such as a bait bucket or live well.

The bait container has generally a round or rectangular shape. A rectangular container includes a width (W) (side), a depth (D), and a length (L). The depth of the container is equal or greater than its width. Preferably D is 1.5 to 5 times W.

The invention is also directed to "retrofit" elements that can be used to render an existing bait bucket or live well chemoluminescent, such as a chemoluminescent disk or aerator that can be placed on the floor of a live well or bait bucket, a cylinder or sheet that can be placed next to the wall of a live well or bait bucket, or a lid that can be placed upon a live well or bait bucket.

Having conceived of the idea of the chemoluminescent live bait container, it becomes a simple matter to select from the well-known materials suitable for use in the present invention.

Preferably, a conventional thermoplastic polymer is mixed with long decay chemoluminescent materials prior to molding. The chemoluminescent material 5 can be used to make the bait container or the retrofit elements.

Luminous extrudable plastics (plastics containing luminous particles) currently on the market include Lumni Nova® Long After Glow and Pro Glow™. The particles used to make the chemoluminescent plastics may be activated by sunlight, UV light, or full spectrum light. The materials used to make the particles for mixing with the plastic may be phosphors or contain strontium oxide.

For example, Nightlight 20™ powder can be mixed with plastic granules for heating and extruding. The manufacturer of Nightlight 20™ powder (alkaline earth metal aluminate oxide curopium doped) states that a mixture of plastic and Nightlight 20™ will remain luminous for 20 hours and maintain true glow in the dark colors of green, blue and yellow.

Materials that may be mixed with a plastic to make the bait containers chemoluminescent are disclosed in U.S. Pat. No. 5,853,614 to Hao, et al and teaches long decay chemoluminescent materials having improved long decay time and improved high brightness represented by the formula as $Sr_0 0.9995_0 0.998$ $Eu_0 0.0005_0 0.002)Al_2O_4.(Sr_0 0.9995_0 0.998$ $Eu_0 0.0005_0 0.002)O$. $(Al_{1-a-b} B_b Dy_a)_2 O_3$ in which a=0.0005 0.0002, b=0.0001 0.35, n=18. This patent teaches methods for manufacturing the long decay chemoluminescent materials characterized in heating the raw materials such as $SrCo_3$, .alpha. type alumina, .gamma. type alumina, boron-containing compound, $Eu_2 O_3$ and $Dy_2 O_3$ gradually from 400° C. up to 1250° C.1600° C. during 710 hours, firing at 1250° C.1600° C. for 35 hours and then cooling gradually from 1250° C.1600° C. down to 200° C. during 7 10 hours, wherein heating, firing, and cooling processes are all conducted in the presence of carbon. The raw materials that make up the long decay chemoluminescent material are strontium carbonate or strontium oxide, alpha type alumina and gamma type alumina, boron oxide or boron compound, europium oxide, and dysprosium oxide. Further, one or more other rare earth elements such as La, Ce, Pr, Nd, Sm, Gd, Tb, Ho, Er, Tm, Yb, Lu etc. may also be added in the chemoluminescent materials.

U.S. Pat. No. 5,376,303 to Royce, et al. teaches long decay phosphors that are comprised of rare-earth activated divalent, boron-substituted aluminates. In particular, the long decay phosphors are comprised of MO.a(Al1-bBb) 2O3:cR, wherein $0.5 \leq a \leq 10.0$, $0.0001 \leq b \leq 0.5$ and $0.0001 \leq c \leq 0.2$, MO represents at least one divalent metal oxide selected from the group consisting of MgO, CaO, SrO, and ZnO, and R represents Eu and at least one additional rare earth element. Preferably, R represents Eu and at least one additional rare earth element selected from the group consisting of Pt, Nd, Dy, and Tm.

Generally, chemoluminescent plastics made with chemoluminescent inorganic materials such as strontium oxide, alumina, boron oxide or boron compound, europium oxide, and dysprosium oxide and other rare-earth metals have the longest decay life. These materials, when incorporated into plastics, have no toxic effects and no radioactivity that would be harmful to the fish. The chemoluminescent material used with the plastic may be primary particles or chemoluminescent substances that have been pretreated with pigments. The grain size of commercially available chemoluminescent particles used to make the chemoluminescent plastic ranges from approximately 3 to 15 um. Preferably, the chemoluminescent particles used in the chemoluminescent material allows the chemoluminescent material to emit a soft glowing light that preserves night vision.

Conventional chemoluminescent material or phosphors comprise a host material that, together with one or more activators, converts absorbed energy into radiant energy. The absorbed energy is provided by various light sources, such as sunlight or electric light, whether UV or full spectrum light. Some of the most widely used host materials are calcuim halophosphate, barium magnesium aluminate, magnesium aluminate, strontium cholorapatite, zinc silicate, and the oxides, oxysulfides, phosphates, vanadates and silicates of yttrium, gadolinium or lanthanum. Commonly used activators are rare-earth ions such as europium Ii and III, terbium III, cerium III, and tin II. Conventionally, compounds containing the host and activator materials are mixed together by a mechanical procedure, such as milling or micronizing, then calcinied to produce fine powder substances of relatively uniform composition.

Once the chemoluminescent powder is formed, for purposes of this invention, it must be mixed with a thermoplastic polymer in an internal mixer to provide a quality product that can be injection molded to make the chemoluminescent bait container or retrofit element.

An example of a process involving mixing of polymeric materials with additive materials is taught in U.S. Pat. No.

5,865,535. Such a process would most likely produce the most uniform batch product. Further, methods are taught for extruding plastic articles having chemoluminescent particles. The same chemoluminescent plastic can be injection molded to form articles. The thermoplastic polymer used in the process may be any polymer that can be used to make a rigid shell or semi-rigid shell such as polypropylene, aliphatic polyamides, polyesters, polymethacrylics, polyacrylates, polycarbonated, polycyanoethylenes, polyacrylonitrides, polyvinyl chloride, polyethylene, polystyrene, polyurethane, acrylate resins, halogenated polymers, and mixtures and blends thereof. Furthermore, methods of providing luminescence to thermoplastic polymer as taught in U.S. Pat. No. 5,674,437 can be used to make a luminescence material. The importance of these processes is that after extrusion, a chemoluminescent product 5 is produced that is able to retain and radiate light (i.e. glow or luminesce) after the activator or charging light source is removed.

A bait container preferably employed in the present invention is characterized by side walls and a bottom wall, and preferably also a lid, wherein any or all of these elements may be made from a chemoluminescent material formed from long decaying chemoluminescent particles and a thermoplastic polymer. The chemoluminescent bait tank radiates light internally and exteriorly.

One way to "retrofit" existing non-chemoluminescent bait containers that are currently in use, would be to make the housing of an aerator positioned within the bait container chemoluminescent. It is preferred that the chemoluminescent particles used to make the chemoluminescent polymeric material have a long decay life so to allow the bait fish and the surrounding area to remain illuminated for more than two hours, preferably more than eight hours.

The present invention will now be discussed in greater detail with reference to the figures.

FIG. 1 shows the housing of a thru-hull live bait well 12. The housing of this bait well has side walls 14 connected to a bottom wall 16. Preferably, the housing is constructed as a unitary structure as shown in the figure. The side walls and bottom wall each have an inner surface 18 and an outer surface 20. The inner surface and outer surface of the side walls emit light 22. The inner surfaces of the side walls and bottom wall form an inner chamber 24 for retaining a quantity of water and live bait fish. The live well can be fixedly installed within the boat or be portable for easy removal. Thirty-gallon portable live wells are popular. The portable bait wells can be easily removed for repair, replacement, or refilling.

With the primary intent of the present invention being to make night fishing safe, economical, and fun, it is important that either the interior of the bait container or both the interior and exterior of the bait container be chemoluminescent.

Figure 2:
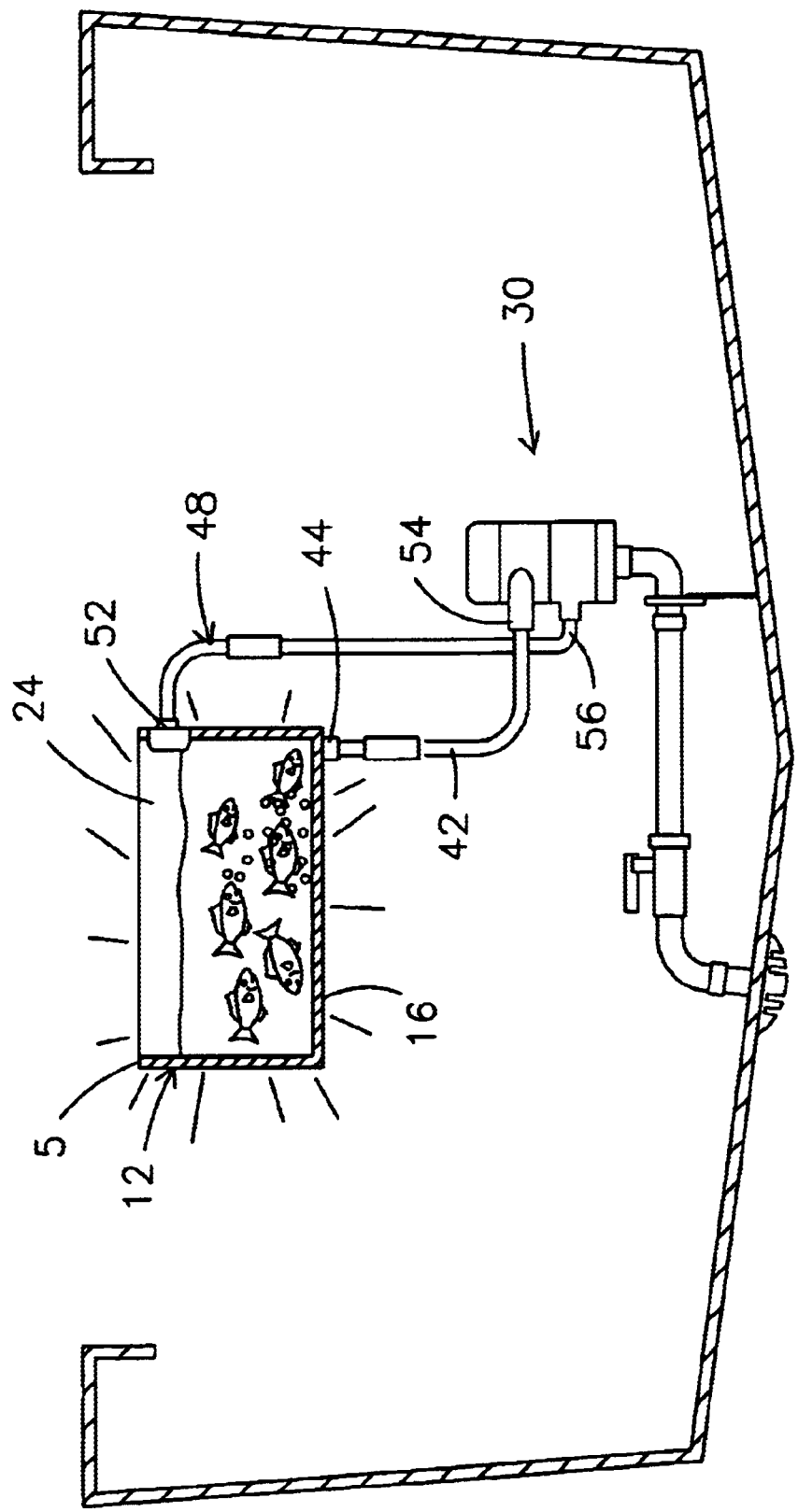
FIG. 2 shown is a cross-sectional view of the chemoluminescent bait tank in communication with an aerator of the present invention.

With it being the a secondary intent of the present invention to prolong the life of the bait fish, the live bait well may be coupled with a thru-hull mounted aerator 30, as shown in FIG. 2. Various aerators can be used in combination with the chemoluminescent bait container. A first aerator, of FIG. 7, employed in the present invention is characterized by the employment of the rapidly rotating impeller 32 of the centrifugal pump to mince air and water prior to delivery to the live well. The centrifugal pumps preferred for use in the present invention are basically similar to a wheel, with vanes or blades called impeller blades sandwiched between upper and lower housings. A fluid-tight means is supplied for driving this impeller. A second aerator type, seen in FIG. 8, that is a preferred aerator 30 of the present inventor comprises: a centrifugal type pump comprising a first impeller 36 (booster) having inlet and outlet edges and, respectively, a second impeller 38 (main impeller) having inlet and outlet edges and, respectively, and a pump casing 40 having at least one pump water inlet, one pump air inlet, and one pump water outlet, with the first and second impellers disposed between the pump casing water inlet and outlet, wherein the air inlet is positioned between the first impeller outlet edge and the second impeller outlet edge and is in communication with air, and wherein the water inlet and outlet are in communication with water.

Figure 7:
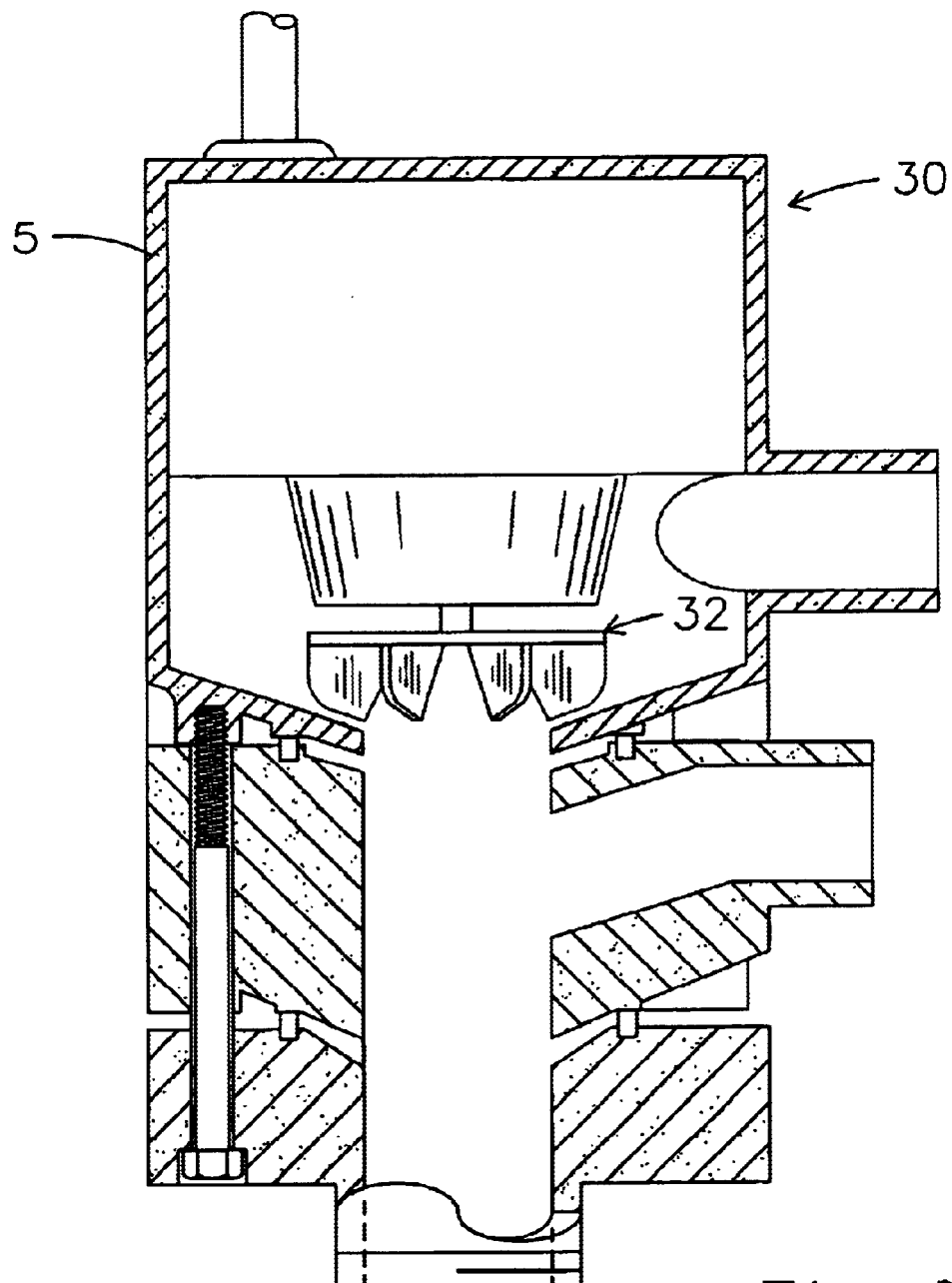
FIG. 7 shown is the cross-sectional view of the first chemoluminescent aerator.
Figure 8:
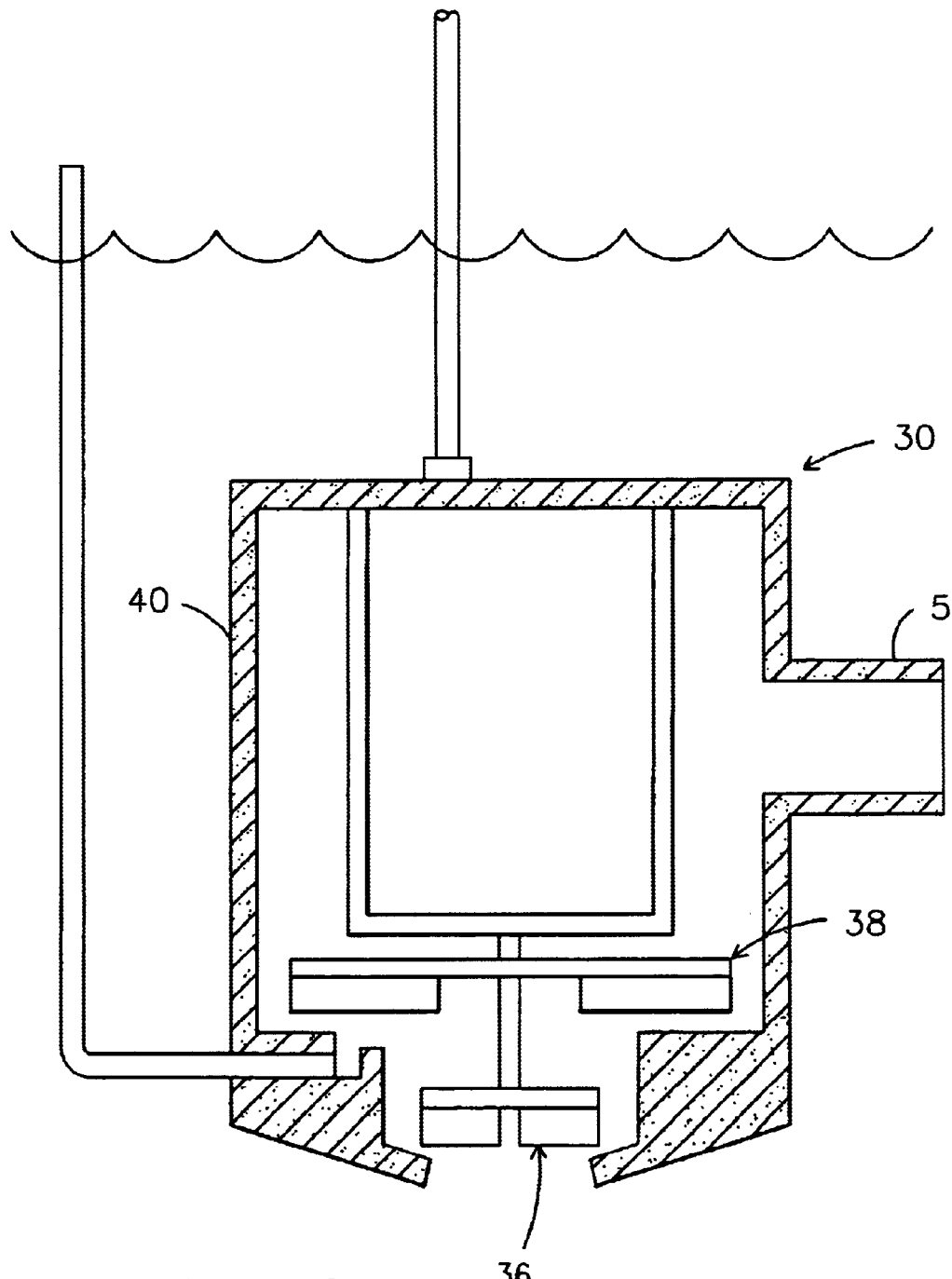
FIG. 8 shown is the cross-sectional view of the second chemoluminescent aerator.

The first aerator type, of FIG. 7, may be placed in a portable bait container such as a "minnow bait bucket," or placed within a bait well built into a boat, or if chemoluminescent, even may be used as an aerator for a fish aquarium. Further, the aerator may be used in any form of live box to aerate the water therein. Placement of the luminous aerator will light the interior of the bait tank or bait bucket, and allow the fisherman to choose the bait fish and hook the bait fish safely.

When either aerator is used with a bait tank, the bait tank has a live well hose 42 that has a first end 44 coupled to the bottom wall 16 of the housing. The live well hose pumps a continuous flow of oxygenated water into the live well. Also, an overflow drain tube 48 is included with the bait tank. The overflow drain tube has a first end 52 coupled to one of the side walls of the housing. The live well hose has a second end 54 coupled with the aerator. Also, the overflow drain tube has a second end 56 coupled with the aerator.

The use of an aerator is a main means to keep the bait fish alive in the bait tank. Providing light in the bait tank is a secondary means to increase the life of the bait fish. Mainly, light in the interior of the bait container helps the fish see and prevents injury from swimming into walls, while at the same time making it easier for the fisherman to bait his hook and select bait fish for use. Illuminating the fish in the bait container can be done by either introducing a chemoluminescent retrofit element 60 or by making the bait tank 12 chemoluminescent. The present invention can be realized either way.

First the present inventor created the chemoluminescent live bait well, as shown in FIG. 1. The bait well has side walls and the bottom walls, and at least one of the walls is formed of the chemoluminescent thermoplastic material 5, as previously discussed, and which after exposure to a light source, emits radiant energy. The portable disc, as shown in FIG. 4, is formed of the same chemoluminescent thermoplastic material. The method of making the disc will be discussed later.

The chemoluminescent bait container, when placed on the boat, provides a soft glowing light that illuminates not only the inner chamber of the bait tank, but may also illuminates the area surrounding the bait tank.

The bait tank may include a lid 64, as shown in FIG. 6, which is adapted for positioning over the housing. The lid may be chemoluminescent or non-chemoluminescent. Preferably, the lid of the bait tank is luminous. The lid may be hingedly attached to the top rim of the bait tank or a freely removable part. Further, the bait tank may include an inner storage tank (not shown) that is sized for positioning within the housing. The inner storage tank has a plurality of side walls interconnected with a bottom wall to form an inner storage chamber, the inner storage chamber is adapted to receive the live bait fish. The side walls of the inner storage tank has a plurality of apertures therein to allow fluid flow between the inner storage chamber and the inner chamber of the housing. In those instances where the bait tank is non-chemoluminescent, the inner storage tank, provided for the bait tank, may be formed of chemoluminescent thermoplastic polymer.

For the fisherman who does most of his fishing from a bridge, a dock, or the shore, the present inventor has created a smaller chemoluminescent bait container. The present inventor applied the technology above to the formation of chemoluminescent bait buckets 66, as illustrated in FIG. 3. With the chemoluminescent bait bucket, the fisherman is provided with a soft light that is not intrusive to its surroundings. The chemoluminescent bait bucket radiates light interiorly and exteriorly. The chemoluminescent bait bucket illuminates the bait fish and prevents the fisherman from hooking his hand when baiting the fish. Further, the chemoluminescent bait bucket illuminates the surrounding area and prevents the fishermen from bumping into the bait bucket, either knocking over the bait bucket or falling over the bait bucket. Furthermore, by illuminating the surrounding area, the bait bucket allows the fisherman to see the bucket, thereby avoiding injury from tripping over the bucket.

As shown in FIG. 3, the bait bucket has an outer bucket 68 with an inner bucket 70 sized to reside within the outer bucket. The outer bucket has side walls 72 connected with a floor 74. The side walls 72 form a top rim 76 that defines an open top of the outer bucket. The inner bucket is a live bait container and has side walls integral with a bottom wall. The inner bucket has a plurality of apertures therein for allowing fluid to flow within a chamber 82 created between the inner surface of the outer bucket and the outer surface of the inner bucket. Preferably, the outer bucket is chemoluminescent with a non-chemoluminescent inner bucket. The light that emits from the inner surface of the outer bucket will enter into the inner bucket by way of the apertures or transparency of the inner bucket. This allows the live bait to be illuminated. Alternatively, or additionally, the inner bucket may be made of chemoluminescent materials.

To keep the live bait fish within the bait bucket, a lid is hingedly connected to the top rim of the outer bucket. The lid may or may not be chemoluminescent. Examples of plastic used to make the bait bucket include the following thermoplastic polymers; polypropylene, aliphatic polyamides, polyesters, polymethacrylics, polyacrylates, polycarbonated, polycyanoethylenes, polyacrylonitrides, polyvinyl chloride, polyethylene, polystyrene, polyurethane, acrylate resins, halogenated polymers and mixtures and blends thereof.

Examples of chemoluminescent particles, which may be compounded into one or a mixture of the above thermoplastic polymers, may be any one or a combination of the following: aluminate oxide, strontium oxide, boron oxide, magnesium oxide, calcium oxide, zinc oxide, europium oxide, dysprosium oxide, curopium and other rare-earth metals.

The average bait bucket does not provide enough oxygenated water to sustain live bait fish for an extended period of time; therefore, the present inventor mounted a pump 88 on the outside of the outer bucket. The pump, as shown in FIG. 5, has an air tubing 90 routed to a space 82 formed between the inner bucket and the outer bucket. A carrying handle 92 is mounted to the outside of the outer bucket. Also, an adjustable strap 94 is mounted to the outside of the inner bucket.

Finally, to provide the most economic means to illuminate live bait fish within a conventional bait container having no chemoluminescent materials incorporated therein, the present inventor developed a flexible glow disc 64 that is removable. The size of the glow disc may vary in accordance with the demand. A cross sectional view of the glow disc is shown in FIG. 4.

The glow disc is formed by combining, in an extruder, a thermoplastic polymer with chemoluminescent particles. The chemoluminescent particles are added in an amount to provide luminescence to the polymer. The combination of the thermoplastic polymer and chemoluminescent particles are heated at a temperature sufficient to melt the thermoplastic polymer. The melted combination is extruded to form a sheet, which is cut or stamped to form a glow disc, or injection molded to form the disk. The glow disc is placed in a bait container housing, and live bait fish are placed into the inner chamber of the housing for use by the fisherman. Prior to placement of the portable disc, the disc is exposed to a light source so to absorb energy for conversion into radiant energy. After sufficient exposure to the light source, the portable disc is placed/dropped into the inner chamber of the bait container wherein the portable disc emits radiant energy in the absence of light to illuminate the inner chamber. The glow disc illuminates the live bait fish within the chamber of the otherwise non-chemoluminescent bait container.

The chemoluminescent particles and the thermoplastic polymer used to make the glow disc are set out above. In making the glow disc flexible or non-flexible, additional additives may be added to the thermoplastic polymer and chemoluminescent particles, the additional additive selected from the group consisting of plasticizers, softners, levelling agents, water repellents, anti-foaming agents, oil-repellant resins, softeners, IR absorbers, anti-static agents, phosphites, acid neutralizers, hindered amine light stabilizers, antioxidants, and chemoluminescent and non-chemoluminescent pigments. Any one of these additives may be used when forming the bait tank, the housing for the aerator, or the bait bucket.

Although the chemoluminescent bait container was first designed as a luminous live well bait tank for aquatic organisms, it is apparent that forming other chemoluminescent bait containers such as a bait bucket was a natural continuation of the present invention by the inventor; further, it will be readily apparent that non-electric illumination of bait fish and the fishing area can be accomplished in a number of other applications, such as using an "aerator" that has a chemoluminescent housing and/or placing the aerator inside the bait container. Although this invention has been described in its preferred form with a certain degree of particularity with respect to an aerator, it is understood that the present disclosure of the preferred form has been made only by way of example and that numerous changes in the details of structures and the composition of the combination may be resorted to without departing from the spirit and scope of the invention.

Now that the invention has been described.

What is claimed is:

1. A chemoluminescent bait container comprising:
    a container for retaining a quantity of water and live bait, said container having side walls with inner and outer surfaces, and a bottom wall; and
    an aerator for aerating the water in said container, said aerator further comprising pumping means for mincing air and the water;

wherein the container is formed of chemoluminescent material; and wherein the inner surfaces of the side walls and the bottom wall emit light after the chemoluminescent material is activated by light to illuminate the live bait when the bait is placed in the container.

2. The chemoluminescent bait container as set forth in claim 1, wherein said bait container is a portable or permanently installed live well.

3. The chemoluminescent bait container as set forth in claim 1, wherein said bait container is adapted to be in communication with water through a hull of a boat.

4. The chemoluminescent bait container as set forth in claim 1, wherein the chemoluminescent material is formed by combining a thermoplastic polymer with chemoluminescent particles.

5. The chemoluminescent bait container as set forth in claim 4, wherein said chemoluminescent particles include metal oxides selected from the group consisting of aluminate oxide, strontium oxide, boron oxide, magnesium oxide, calcium oxide, zinc oxide, europium oxide, dysprosium oxide, curopium, and other rare-earth metals.

6. The chemoluminescent bait container as set forth in claim 4, wherein said thermoplastic polymer is selected from the group consisting of polypropylene, aliphatic polyamides, polyesters, polymethacrylics, polyacrylates, polycarbonated, polycyanoethylenes, polyacrylonitrides, polyvinyl chloride, polyethylene, polystyrene, polyurethane, acrylate resins, halogenated polymers, and mixtures and blends thereof.

* * * * *